United States Patent

[11] 3,615,805

| [72] | Inventors | Felix Frederick Ehrich<br>Westfield;<br>Howard Matrick, Springfield, both of N.J. |
|---|---|---|
| [21] | Appl. No. | 764,329 |
| [22] | Filed | Oct. 1, 1968 |
| [45] | Patented | Oct. 26, 1971 |
| [73] | Assignee | E. I. du Pont de Nemours and Company<br>Wilmington, Del. |

[54] BETA-PHASE PHTHALOCYANINE PIGMENT
2 Claims, No Drawings

[52] U.S. Cl. .................................................. 106/288 Q,
106/193 J, 260/314.5
[51] Int. Cl. ........................................................ C08h 17/04

[50] Field of Search ........................................... 106/193,
288 O; 260/314.5

[56] References Cited
UNITED STATES PATENTS

| 3,065,092 | 11/1962 | Geiger ......................... | 106/176 |
| 2,933,505 | 4/1960 | Jackson ....................... | 260/314.5 |

*Primary Examiner*—Morris Liebman
*Assistant Examiner*—T. Morris
*Attorney*—Frank R. Ortolani

ABSTRACT: Beta-phase copper phthalocyanine admixed with at least 0.1 percent by weight of a reaction product of pyridine, phthalonitrile and cupric chloride, a pigment having improved resistance to crystal growth at elevated temperature or in crystallizing solvents.

BETA-PHASE PHTHALOCYANINE PIGMENT

BACKGROUND

Phthalocyanine pigments are well known and extensively used, and their intense color, good chemical stability, strength and general combination of properties justify their general regard as an outstandingly good group of pigments. However, the phthalocyanines do suffer from a number of defects. For example, copper phthalocyanine and phthalocyanine pigments generally exist in two or more polymorphs and the metastable ones tend to revert to the stable form, with change in color, increase in particle size, and a decrease in strength. One means of avoiding such polymorphic transformation is to use the pigment in the form of the stable phase (referred to as the beta phase). However, this does not represent a complete solution to the problem of pigment stability, for although phase transformation does not occur upon exposure of beta-phase pigment to heat or to crystallizing solvents, it has been found that the pigment particles do tend to undergo crystal growth with consequent loss of strength and change in tinctorial properties. Crystallizing solvents are solvents in which phthalocyanines have slightly greater solubility than that in straight chain aliphatic solvents ("Phthalocyanine Compounds" by Moser et al., Reinhold, 1963, p. 25.

Stability to heat is especially important in pigmentation of plastics, for example the polyalkenes such as polyethylene and polypropylene. Even when pigmented with the stable beta-phase polymorph, such systems show marked changes in color at elevated temperatures. This necessitates imposition of extremely close tolerances on conditions for processing such pigmented systems, hinders the reprocessing of scrap material, and is economically wasteful because of serious strength loss resultant from crystal growth of the pigment when it is heated to high temperatures.

A related problem is encountered when the pigments are used in coating compositions containing the usual solvents, in which phthalocyanine pigments show crystal growth. The pigment strength obtained in such systems is significantly less than that inherent in the starting pigment, the color and other properties of the pigment vary according to the duration and type of exposure to the solvent, and gloss, transparency, and other properties influenced by particle size are very difficult to control at the optimum condition.

Other areas in which improvements have been desired are pigment dispersibility, and gloss and flocculation resistance of coating compositions pigmented with beta-phase phthalocyanine pigments.

It is well known in the art to stabilize alpha-phase copper phthalocyanine against crystal growth by the introduction of chlorine into the molecule, preferably in the 4-positions. (See U.S. Pat. No. 2,933,505). This has not provided an effective means for stabilization of beta-phase phthalocyanines against crystal growth. In the case of copper phthalocyanine, for example, the introduction of sufficient chlorine into the molecule to prevent crystal growth also stabilizes the alpha phase, and such products are not readily converted to a stable beta-phase pigment. Stabilized alpha-phase pigments are not suitable tinctorially for all applications; the greener hue of the beta-phase is desired in many instances. Hence it is commercially important to provide improved beta-phase phthalocyanine pigments.

SUMMARY OF THE INVENTION

In the present discovery there are provided new pigmentary compositions consisting essentially of beta-phase phthalocyanine and a small amount of a reaction product of a phthalonitrile, a copper compound such as cupric chloride, and a nitrogen base such as pyridine, quinoline, picoline and isoquinoline. When these compositions are employed in their usual manner, such as in plastic compositions subjected to elevated temperatures or in paint or like coating compositions which include crystallizing solvents for the phthalocyanine, deleterious growth of the phthalocyanine pigment particles does not occur. Other advantages will be apparent from the following detailed description and exemplifications of the discovery.

The present discovery is of primary importance with respect to beta-phase copper phthalocyanine, and the detailed description will be given as applied to that material. However, the discovery may be applied with other beta-phase phthalocyanines such as metal-free beta-phase phthalocyanine as well as beta-phase iron or cobalt phthalocyanine. These phthalocyanines, as used herein, are chlorine-free or essentially so. The beta-phase phthalocyanines are known in the art, to which reference can be made for details of their preparation.

The additive which imparts the described stability to beta-phase phthalocyanines according to this discovery is the indicated reaction product. To obtain that product, reaction can be conducted in any manner desired. However, it is preferred that the reactants simply be admixed, with the solids being in a fine state of subdivision to facilitate reaction, and the mixture heated to a temperature of above about 180° C. but below that at which the reactants carbonize. A usual range is 180° to 250° C. Heating is generally carried out for one-half to 2 hours or more, and in any event until a blue solid is obtained. If desired, the reaction also can be carried out in an inert solvent. The solid obtained preferably is purified and reduced in size for use, but may be used in the crude form. The solid can be used in the form of a powder, as a presscake, or in the form of sulfuric acid solution from which it is regenerated by dilution with water in accordance with procedures well known to those skilled in the art. In general in making the reaction product about 4 mols of a phthalonitrile are used per mol of copper chloride, and 0.05 mol to 0.6 mol of tertiary nitrogen base, such as pyridine, per mol of phthalonitrile must be used. Preferably 0.20 to 0.25 mol of such nitrogen base per mol of phthalonitrile is used, with smaller amounts producing a less effective product and larger amounts making no proportionate contribution. It is a characteristic of this discovery that in going to pigment size either a chemical process or mechanical milling can be used on the phthalocyanine and the additive to secure pigment particles, without adverse effect.

In forming compositions of this invention, the beta-phase phthalocyanine in crude form, as a presscake, slurry, or in pigmentary size, is thoroughly mixed with 0.1 to 50° percent, and preferably 0.1 to 30° percent, of the additive, based on the weight of the phthalocyanine present. Mixing can be accomplished in any manner desired, suitable examples including slurry mixing, milling, and the like.

The new compositions of this invention can be employed in the same manner and amounts as the beta-phase phthalocyanine pigments have been used heretofore. Typical applications are for pigmenting plastics, especially polyolefins, coating compositions such as paints and enamels. Specific materials which can be pigmented include polyethylene and polypropylene plastics, and film-forming coating components such as alkyd resins, cellulose esters and oleoresinous varnishes and the like. Other materials with which these compositions can be used will be apparent to the artisan. About 0.01 to 25 percent of this pigment is used, based on the resin or a solids material of the coating composition being pigmented.

The following examples serve to illustrate this invention, and the details given are not to be construed as limiting. Unless otherwise indicated, all parts and percentages are by weight.

EXAMPLE I

To 6.0 parts of anhydrous cupric chloride in a mortar are added, in portions, with intermittent grinding, 3.0 parts of pyridine, followed by 20.0 parts phthalonitrile. The resulting intimate mixture is heated at 230° C. for 1 hour in an open glass container. The resultant blue cake is colled, pulverized, and added to a solution of 3.7 parts of concentrated sulfuric acid in 1,500 parts of water to produce a slurry thereof. The slurry is boiled for 1 hour. The product is collected by filtration and is washed substantially free of acid and sulfate ion.

The resultant presscake can be combined with a beta-phase copper phthalocyanine before drying to produce a composition of the invention or, alternatively, the presscake can be dried and the dry product mixed with beta-phase phthalocyanine. The product can be reduced in particle size by acidpasting, salt-milling or like methods well known in the art, before mixing with beta-phase copper phthalocyanine. It is preferred to reduce the particle size before use, but the product is also significantly effective when used in crude form without size reduction.

EXAMPLE II 100 parts of 1-chloronaphthalene are brought to boil (264° C.) in each of two glass flasks. An intimate mixture of 0.75 part of the dry product of example I and 4.25 parts of pigmentary beta-phase copper phthalocyanine is added to one flask and 4.25 parts of pigmentary beta-phase copper phthalocyanine are added to the other flask. After heating at the boil for 30 minutes under a reflux condenser, 100 parts of 1-chloronaphthalene at room temperature are added to each flask, bringing the temperature to 170° C. The slurries are then filtered separately, and the pigments are washed with benzene and dried.

The products obtained are than examined with an electron microscope. Electron micrographs thereof show that the sample containing the product from example I contains crystallites with an average size of only approximately 0.2 microns, whereas the other sample, which contains none of the product from example I, has crystals which are much larger, some exceeding 2.0 microns in length.

Similar results are obtained when the experiment is carried out using kerosene, rather than 1-chloronaphthalene, as the heated liquid. In the kerosene case also, the sample containing the product from example I is much smaller in particle size after heating with the crystallizing solvent than is the pigment without the additive from example I. The larger particle size pigment is much the weaker in each case, as judged by the quantity required to produce a given depth of color when mixed with a white pigment.

Beta-phase copper phthalocyanine, although thermodynamically stable, does undergo particle size growth on heating in plastics which are processed at high temperatures. This increase in particle size, believed to be the result of the well known "Ostwald ripening" phenomenon, results in significant decrease in pigment strength. Such strength loss means that more pigment is required to obtain a given depth of color in the case of pigments processed at high temperatures in plastics. This is an economic disadvantage and also causes problems in color control, so that stringent temperature limits are required for duplication of color. Furthermore, it is difficult to reclaim scrap material from previous fabrications since the use of such material tends to alter the color because of the change which the previously treated pigment had undergone. These disadvantages are substantially overcome by the present invention as is illustrated by the following example.

EXAMPLE III

A. A color concentrate is produced as follows: 17 parts of beta-phase copper phthalocyanine and 31 parts of the product of example I are added with stirring 1,100 parts of linear polyethylene ("Alathon" 704, E.I. Du Pont De Nemours and Co.). The material is mixed by stirring by hand and by tumbling the container. The blended material is then added to an unheated "Banbury" mixer (Farrel Corp. Ansonia, Conn.), a heavy-duty kneader. The charge is blended in the "Banbury" for 3 minutes. The mixer is then emptied by rotating the blades and the discharged material is granulated by chopping the concentrate from the mixer in a granulator.

A concentrate of titanium dioxide in the proportions of 30 parts of titanium dioxide per 100 parts of the polyethylene resin is also prepared by blending in the "Banbury" as just described. The color concentrate produced in the "Banbury" is mixed in a polyethylene bag with the titanium dioxide concentrate, in the proportions of 587 parts of the $TiO_2$ concentrate to 757 parts of the color concentrate, and 12,340 parts of polyethylene ("Alathon" 7040) pellets. This blend is charged to the hopper of a Killion extruder operating with a die temperature of 400° F. (A Killion extruder is a screw-type mixer-extruder manufactured by Killion Extruder Inc., Verona, N.J.).

The material extruded consists of a thoroughly mixed dispersion of titanium dioxide and beta-phase copper phthalocyanine pigment, dispersed in polyethylene. The heat stability of this material is determined by molding chips in a laboratory Van Dorn injection molder (Van Dorn Iron Work Co., Cleveland, Ohio) under controlled temperature conditions so that chips are produced at temperatures of 400°, 450°, 500°, 550°, and 600° F. with a 10 minute dwell time at each of the temperatures. A comparison of the colors of the chips processed at the various temperatures, particularly a comparison of that molded at 600° F. with that produced at 400° F., gives a measure of the heat sensitivity of the copper phthalocyanine pigment.

B. For control purposes a beta-phase copper phthalocyanine pigment is dispersed and extruded in the same manner and polymer as described in A but without the use of any of the product from example I.

A comparison of the chips processed at the various temperatures shows substantially no strength loss or color change in the case of sample A whereas sample B shows marked color difference between the chip processed at 600° F. and that at 400° F., corresponding to the color change resulting from a decrease of about 25 percent in colored pigment. Electron micrographs of pigment from the chips show pronounced crystal growth occurs in the case of sample B, which accounts for the loss in strength and color change in this case.

The apparent magnitude of the improvement in heat stability by this test varies with the proportion of the additive from example I which is used in the pigment blend, and also with the overall colored pigment concentration in the polymer. At very high concentrations of phthalocyanine pigment, the color is so dark that the effects of heat instability are partially masked and are not strikingly evident; at a very low concentration of phthalocyanine pigment (e.g., 0.01 percent based on the polymer) the beneficial effects of the additive are less noticeable. The maximum benefit appears to be obtained at a copper phthalocyanine pigment concentration of approximately 0.1 percent based on the polymer.

The effectiveness of the additive from example I in stabilizing the beta-phase phthalocyanine pigment against its crystal growth in the polymer varies with proportion of the additive used, as well as with the overall pigment concentration. For a total pigment concentration (copper phthalocyanine pigment) of 0.1 percent, based on the polymer, the use of 15 percent, based on the copper phthalocyanine pigment, of the additive exerts a pronounced effect. Use of very large proportions (e.g., 50 percent) of the additive is, in general, undesirable owing to excessive dilution of the prime pigment.

Example III shows the stabilizing effect of the additive in linear polyethylene, and similar stabilizing effect is noted in polypropylene, polystyrene, polyacrylonitrile-butadienestyrene (ABS resin) and like polymers processed at elevated temperatures.

EXAMPLE IV

Pigmentary beta-phase copper phthalocyanine is prepared by milling crude beta-phase phthalocyanine, obtained by reacting cupric chloride, urea, ammonium molybdate and phthalic anhydride at about 200° C. in kerosene, in accordance with procedures well known in the art. Following completion of the reaction the crude pigment is isolated by the steps of filtration (to remove kerosene), steam distillation (to remove residual kerosene), aqueous extraction (to remove salts and other water-soluble impurities) and drying. The crude pigment is converted to pigmentary form by grinding with aluminum sulfate in the presence of tetrachloroethylene, as described in example 1 of U.S. Pat. No. 3,030,370.

A ball mill with an internal diameter of about 240 inches and a total capacity of about 60 gallons is charged with 1,000 lbs. of "cyl-pebs" (cylindrical bars of iron approximately one-half inch in diameter and 1 inch long). Nine pounds (1 part) of the crude chlorine-free copper phthalocyanine are then charged to the ball mill together with about 58 pounds (6.44 parts) of commercial aluminum sulfate Al$_2$(SO$_4$)$_3$ 15–18H$_2$O, and about 1.3 pounds (0.144 part) of tetrachloroethylene. The mill is rotated at a speed of about 40 r.p.m. (about 74 percent of critical speed) for 24 hours at a temperature of about 40° C., after which the mixture of pigment and aluminum sulfate is discharged from the mill through a screen which retains the "cyl-pebs." The powder mixture is then added to and thoroughly wet with about 1,000 pounds of a 5 percent solution of sulfuric acid, and the salt and soluble impurities are extracted by stirring near the boiling point for about 1 hour. After this, the pigment is isolated by filtering, washing free of soluble salts and drying at about 60° C.

The pigment obtained is dispersed in a thermoplastic acrylic lacquer by ball-milling as follows: into a ball mill of such size that the total final mill charge does not exceed 40 percent of the mill volume, are added 12.0 parts of the aforementioned beta-phase copper phthalocyanine, 39.6 parts of a 50 percent solution of a methyl methacrylate polymer in xylene, and 68.4 parts of a mixed solvent comprised of 50 percent toluene, 30 percent methyl ethyl ketone and 20 percent cellosolve acetate. Steel balls are added to the mill in such proportion that the total mill charge does not exceed approximately 40 percent of the mill volume and the charge is ground by rotating the mill for 48 hours at a mill speed corresponding to approximately 70 percent of the critical speed, where the critical speed is that speed at which the mill charge is just centrifuged to the periphery of the mill. To the mill are then added an additional 120 parts of the aforementioned methyl methacrylate 50 percent solution in xylene, which is then thoroughly mixed in by rotating the mill for about 30 minutes. 80.4 parts additional methyl methacrylate solution are than mixed thoroughly with the contents of the mill (to result in 10 parts of polymer per part of pigment). The steel balls are separated from the liquid by sieving and a measure of the rheological properties of the fluid is obtained by measuring the flow time from a "Ford Cup," an efflux type viscometer widely used in the paint industry.

Other grinds are made concurrently with replacement of a portion of the pigmentary beta-phase copper phthalocyanine with the product of example I, in the proportions given in the table. The data obtained are as follows:

TABLE I

| Grind | Percent beta phase CPC | Percent Example I product | Pigment strength* | Ford Cup reading** |
|---|---|---|---|---|
| 1 | 100 | 0 | 100 | 103 |
| 2 | 95 | 5 | 98 | 90 |
| 3 | 90 | 10 | 95 | 86 |
| 4 | 85 | 15 | 94 | 80 |
| 5 | 80 | 20 | 95 | 77 |
| 6 | 75 | 25 | 96 | 76 |

*Parts of mixed pigment to produce same depth of color as 100 parts of beta phase pigment alone. Thus, a reading of 95 means approximately a 5% increase in strength.
**The Ford Cup is an efflux type viscometer. The time (in seconds) required for a given quantity of paint to flow from the cup through an orifice is taken as a measure of viscosity. The less the Ford Cup reading, the more fluid the system.

The results clearly show the marked beneficial effect on pigment strength and rheological properties produced by use of the product of example I in the paint grind. The optimum proportion of additive is about 15 percent. A marked improvement in gloss is evident in some systems from the use of 1 percent is discernible.

Similar improvements are obtained with other beta-phase phthalocyanine pigments and with beta-phase copper phythalocyanine processed by methods other than the salt-solvent milling described here. percent of additive, and the effect of as little as 0.1 percent is discernible.

Similar improvements are obtained with other beta-phase phthalocyanine pigments and with beta-phase copper phthalocyanine processed by methods other than the salt-solvent milling described here.

EXAMPLE V

Beta-phase copper phthalocyanine, prepared as indicated in example IV, is dispersed in a thermosetting acrylic enamel by ball milling in conventional manner to yield a pigmented enamel containing 15 parts of pigment to 100 parts of binder. The binder in this case consists of a mixture of hydroxyl-modified methyl methacrylate polymer with a melamine resin in the proportions of 70 parts of acrylic resin to 30 parts of melamine resin. Grinds are also made with replacement of various proportions of the pigment with the product of example I, as shown in table II. The tinting strengths of the enamels are determined in conventional fashion and the enamels are evaluated for flocculation on a score of 10=no flocculation, and 0=extreme flocculation. Ball mill grinds are also made with inclusion in the grind of a small amount of a calcium salt of hydrogenated rosin, to facilitate pigment dispersion. The data are:

TABLE II

| Grind | Beta-phase CPC, percent | Product of Example I, percent | Calcium salt of hydrogenated rosin* | Relative initial strength | Flocc. resistance |
|---|---|---|---|---|---|
| 7 | 100 | 0 | 0 | Control | 6 |
| 8 | 85 | 15 | 0 | 8% strong | 9 |
| 9 | 100 | 0 | 10 | 2% weak | 6 |
| 10 | 95 | 5 | 10 | 4% strong | 7 |
| 11 | 85 | 15 | 10 | 5% strong | 9 |
| 12 | 85 | **15 | 10 | Equal | 9 |

*Percent by weight based on CPC plus additive.
**Addition of the product of Example I delayed until 2 days after ball milling.

A significant improvement in strength is indicated in every case in which the product of example I is included in the grind. The low tinting strength obtained in 12, in which the addition is delayed until 2 days after completion of the grind, is attributed to loss of strength resultant from crystal growth in the absence of the stabilizing action of the product of example I for 2 days. Noteworthy is the significant improvement in flocculation in every case in which the additive from example I is used, even in the smallest amount 5 percent) shown. It is also evident that flocculation behavior is improved even when the addition is delayed (12).

Similar benefits are obtained when the product of example I is used in thermosetting acrylic enamels pigmented with beta-phase copper phthalocyanine processed by methods other than milling with aluminum sulfate and tetrachloroethylene. For example, crude beta copper phthalocyanine is converted to pigmentary form by milling with solvent, as described in U.S. Pat. No. 2,556,726, and incorporated in a thermosetting enamel as previously described. Strength, gloss, flocculation behavior and rehological properties are all improved if a small proportion of the product of example I is included in the paint grind.

EXAMPLE VI

Pigmentary beta-phase copper phthalocyanine, prepared as described in the example I of U.S. Pat. No. 3,030,370 by milling with aluminum sulfate, is incorporated in a nitrocellulose ink by ball milling, in the proportions of 16 parts of dry pigment to 184.0 parts of nitrocellulose vehicle. The vehicle solution used in this case is prepared by dissolving alcohol-wet nitrocellulose in solvent as follows:

| | | | |
|---|---|---|---|
| Alcohol-wet nitrocellulose 70% solids) | | | 290.0 parts |
| Ethanol | | | 122.0 parts |
| Butanol | | | 150.0 parts |
| Mixed solvent | | | |
| | Ethyl acetate | 12.5% ) | |
| | Butyl acetate | 37.0 ) | |
| | Ethanol | 3.5 ) | 930.0 parts |
| | Butyl alcohol | 12.0 ) | |
| | Toluene | 35.0 ) | |
| Tri-cresylphosphate are: | | | |

8.0 parts

Like grinds are also made with replacement of a portion of the beta copper phthalocyanine pigment with an equal quantity of the product of example I, as indicated in table III. Tinctorial strengths are determined, and rheological properties of the inks are measured by use of a Brookfield Synchro-Lectric viscometer (Brookfield Engineering Laboratories, Sharon, Mass., USA) and the #5 Zahn Cup (an efflux-type viscometer). The Brookfield viscometer measures consistency in terms of the drag produced on a spindle rotated in the material being tested, the readings increasing with increased viscosity. The data are:

TABLE III

| | | | Rheological properties | | |
|---|---|---|---|---|---|
| Grind | Percent product of Example I | Tinctorial strength | #5 Zahn Cup time seconds | Brookfield readings (cps.) at— | |
| | | | | 6 r.p.m. | 60 r.p.m. |
| 13 | 0 | Control | 105 | 14,000 | 3,100 |
| 14 | 5 | Equal | 67 | 6,600 | 1,740 |
| 15 | 15 | 2% strong | 13 | 275 | 235 |
| 16 | 25 | 4% strong | 13 | 250 | 230 |

The marked decrease in viscosity with use of the additive is of considerable commercial importance, as it permits the formulation of a strong, highly pigmented ink which is sufficiently fluid for use in printing. There is a dramatic increase in transparency with use of the additive. Such a change is much desired in prints on aluminum and other metallic foils to enhance the decorative metallic effect.

EXAMPLE VII

Beta-phase copper phthalocyanine pigment is dispersed in cellulose acetate butyrate resin by working the mixture on a heated high-shear two-roll plastics mill. The pigment dispersion, in the form of brittle chips, is then added slowly with stirring to an acrylic lacquer vehicle to yield a pigmented acrylic lacquer similar to that described in example IV. Such lacquers are markedly improved in tinting strength, transparency, gloss and rheological properties if a portion of the pigment is replaced with the product of example I. This is true both in the case of beta-phase copper phthalocyanine processed by salt-solvent milling and that processed by grinding in solvent. The increased transparency obtained from use of the product of example I is particularly important in metallized automotive finishes because of enhanced metallic effect and greater "two-tone" effect. "Two-tone" is used in the trade to designate change in appearance with change in angle of viewing.

EXAMPLE VIII

Dispersions of beta-phase copper phthalocyanine pigments, with and without the addition of the product of example I, are prepared in a thermoplastic acrylic lacquer by conventional sand milling. In this type of milling the pigment is dispersed by stirring it with the vehicle and sand, and then separating the sand by sieving. The enamels obtained in the presence of the product of example I are better than the counter parts without this additive in flocculation properties, gloss, transparency, rheological properties and freedom from grit. The data are in table V. The apparent synergistic effect of the calcium salt of hydrogenated rosin with the product of example I is worthy of note.

TABLE V

| Pigment | Hegman Guage reading* | Ford Cup times | Brookfield viscosity at— | | | |
|---|---|---|---|---|---|---|
| | | | 6 r.p.m. | 12 r.p.m. | 30 r.p.m. | 60 r.p.m. |
| Beta CPC | 7.0 | 135 | 5,000 | | | |
| Beta CPC plus 15% additive | 8.0 | 51 | 300 | 267 | 200 | 165 |
| Beta CPC plus 15% additive plus 10% calcium salt of hydrogenated rosin | 8.5 | 34 | 125 | 100 | 95 | 93 |

*This is a widely used measure of grit in the dispersion. The lower the number, the more grit.

From the foregoing discussion and data, it should be evident that the present invention is a useful and surprising advance in the art of beta-phase phthalocyanine pigments. While the invention has been described with certain detail, it should be evident that changes can be made without departing from its scope. For example, in preparing the additive phthalonitriles substituted with a radical such as methyl, ethyl or propyl, or a halogen such as flourine, chlorine or bromine may be employed in place of or in conjunction with unsubstituted phthalonitrile.

The preferred procedure (see example I) shows the reaction being carried out in the absence of a diluent, but the reaction can also be carried out in the presence of an inert diluent such as kerosene, trichlorobenzene, and other reaction media found useful in the well-known phthalonitrile synthesis of copper phthalocyanine. Other changes will occur to those in the art upon consideration of the foregoing specification.

We claim:

1. A composition of matter consisting essentially of at least one $\beta$-phase phthalocyanine in intimate admixture with from about 0.1 to 30 percent by weight, based on said phthalocyanine, of the reaction product of (1) phthalonitrile, (2) a copper chloride, and (3) an aromatic tertiary nitrogen base selected from the group consisting of pyridine, quinoline, picoline, and isoquinoline; the mol ratios of reactants (1), (2), and (3) being within the following limits: (a) about 3.5 to about 4 mols of phthalonitrile per mol of said copper chloride; and (b) about 0.05 to about 0.6 mol of said nitrogen base per mol of phthalonitrile.

2. The composition according claim 1 in which the molar ratios of reactants (1), (2), and (3) are within the following limits: about 3.5 mols of phthalonitrile per mol of said copper chloride, and from about 0.20 to about 0.25 mol of said nitrogen base per mol of phthalonitrile.